(12) United States Patent
Ellison

(10) Patent No.: US 8,100,478 B2
(45) Date of Patent: Jan. 24, 2012

(54) VEHICLE SEAT ASSEMBLY

(75) Inventor: Terrie Ellison, Hilliard, OH (US)

(73) Assignee: Honda Motor Co., Ltd., Tokyo (JP)

(*) Notice: Subject to any disclaimer, the term of this patent is extended or adjusted under 35 U.S.C. 154(b) by 22 days.

(21) Appl. No.: 12/498,002

(22) Filed: Jul. 6, 2009

(65) Prior Publication Data
US 2011/0001343 A1 Jan. 6, 2011

(51) Int. Cl.
B60N 2/02 (2006.01)

(52) U.S. Cl. .................. 297/341; 297/378.1; 297/362

(58) Field of Classification Search .............. 297/15, 297/94, 283.1, 283.4, 340, 378.1, 65.01, 297/65.16, 362, 341, 92, 93, 342, 343; 296/65.01, 296/65.16
See application file for complete search history.

(56) References Cited

U.S. PATENT DOCUMENTS

| | | | |
|---|---|---|---|
| 593,263 A * | 11/1897 | Willis | 297/362 |
| 749,097 A * | 1/1904 | Repsdorph et al. | 297/65 |
| 1,640,984 A * | 8/1927 | De Petris | 297/66 |
| 2,594,882 A * | 4/1952 | De Rose | 248/394 |
| RE25,293 E | 12/1962 | Pickles | |
| 5,149,171 A * | 9/1992 | Gilevich et al. | 297/94 |
| 5,354,120 A * | 10/1994 | Volkle | 297/300.1 |
| 5,984,412 A | 11/1999 | Magyar | |
| 6,095,606 A * | 8/2000 | Opsvik | 297/340 |
| 6,193,317 B1 * | 2/2001 | Mitschelen et al. | 297/378.1 |
| 7,255,399 B2 * | 8/2007 | White et al. | 297/378.12 |
| 2004/0245829 A1 | 12/2004 | Haladuda et al. | |
| 2006/0061183 A1 | 3/2006 | White et al. | |
| 2006/0131946 A1 * | 6/2006 | Andrigo et al. | 297/378.1 |

FOREIGN PATENT DOCUMENTS

| | | | |
|---|---|---|---|
| JP | 10-16619 | | 1/1998 |
| KR | 2003035504 A | * | 5/2003 |
| SU | 959767 A | * | 9/1982 |
| WO | WO 02079000 A1 | * | 10/2002 |

* cited by examiner

Primary Examiner — Milton Nelson, Jr.
(74) Attorney, Agent, or Firm — Rankin Hill & Clark LLP

(57) ABSTRACT

A vehicle seat assembly includes a seat base having a rack gear mounted thereto and a seat back pivotally mounted to the seat base with a pinion gear mounted at a lower end thereof. The pinion gear and the rack gear are arranged such that pivotal movement of the seat back effects longitudinal movement of the seat base.

17 Claims, 4 Drawing Sheets

VEHICLE SEAT ASSEMBLY

BACKGROUND

The present disclosure generally relates to a vehicle seat assembly, and more particularly relates to a rack and pinion arrangement for a vehicle seat assembly having a seat base and a seat back rotatably coupled to the seat base.

It is known to employ a fold-down seat back in a vehicle seat to provide increased cargo carrying capacity to a vehicle. Some vehicle seats use a fixed seat cushion with a pivotally mounted seat back. While simple in construction, a drawback of this arrangement is that the stationary seat cushion can interfere with fully folding the seat back to a horizontal position. With reference to FIG. 1, such a prior art vehicle seat assembly 10 is shown having a fixed seat base 12 and a seat back 14 pivotally mounted to the fixed seat base 12. As shown, the seat base 12 prevents the seat back 14 from being fully folded down into a horizontal position and thus a rear side surface 14a of the seat back 14 cannot be positioned so as to be coplanar with a cargo floor 16 arranged behind the vehicle seat assembly 10.

One solution proposed for dealing with this problem includes moving the cargo floor 16 up vertically so that the seat back 14 would not have to move to the fully folded position; however, this undesirably reduces cargo space between the cargo floor 16 and the roof (not shown) disposed in the vehicle above the cargo floor 16. Another proposed solution would be to move the body floor 18, on which the vehicle seat assembly 10 is mounted, vertically down thereby permanently lowering the seat base 12; however, such movement of the seat base 12 may not be possible for particular vehicle layouts because other components may be disposed below the seat base 12 and/or the body floor 18 (e.g., fuel tank, suspension components, etc.).

Other vehicle seats overcome the problems associated with the simple pivoting arrangement illustrated in FIG. 1 by employing a four-bar linkage to move the seat base and seat back relative to one another. For example, some four-bar linkage arrangements are used to lower the seat base simultaneously with movement of the seat back being folded down into a stowed position. Unfortunately, most current four-bar linkage systems are often complex and expensive.

BRIEF DESCRIPTION

According to one aspect, a vehicle seat assembly includes a seat base having a rack gear mounted thereto and a seat back pivotally mounted to the seat base with a pinion gear mounted at a lower end thereof. The pinion gear and the rack gear are arranged such that pivotal movement of the seat back effects longitudinal movement of the seat base.

According to another aspect, a rack and pinion seat assembly is provided for a vehicle. More particularly, in accordance with this aspect, the rack and pinion seat assembly includes a seat base mounted in a vehicle and a seat back pivotally mounted to the seat base. A pinion gear is mounted to the seat back and a rack gear is mounted to the seat base. The pinion gear is mechanically coupled to the rack gear so that the seat base moves along an axis defined by the rack gear as the seat back is pivoted relative to the seat base.

According to still another aspect, a rack and pinion arrangement is provided for a vehicle seat assembly having a seat base and a seat back rotatably coupled to the seat base. More particularly, in accordance with this aspect, the rack and pinion arrangement includes a rack gear having teeth mounted to the seat base and a pinion gear having teeth mounted to the seat back. The teeth of the pinion gear are mechanically coupled with the teeth of the rack gear to move the rack gear along an axis defined thereby when the pinion gear is rotated relative to the rack gear by rotatable movement of the seat back.

DETAILED DESCRIPTION

Figure 1:
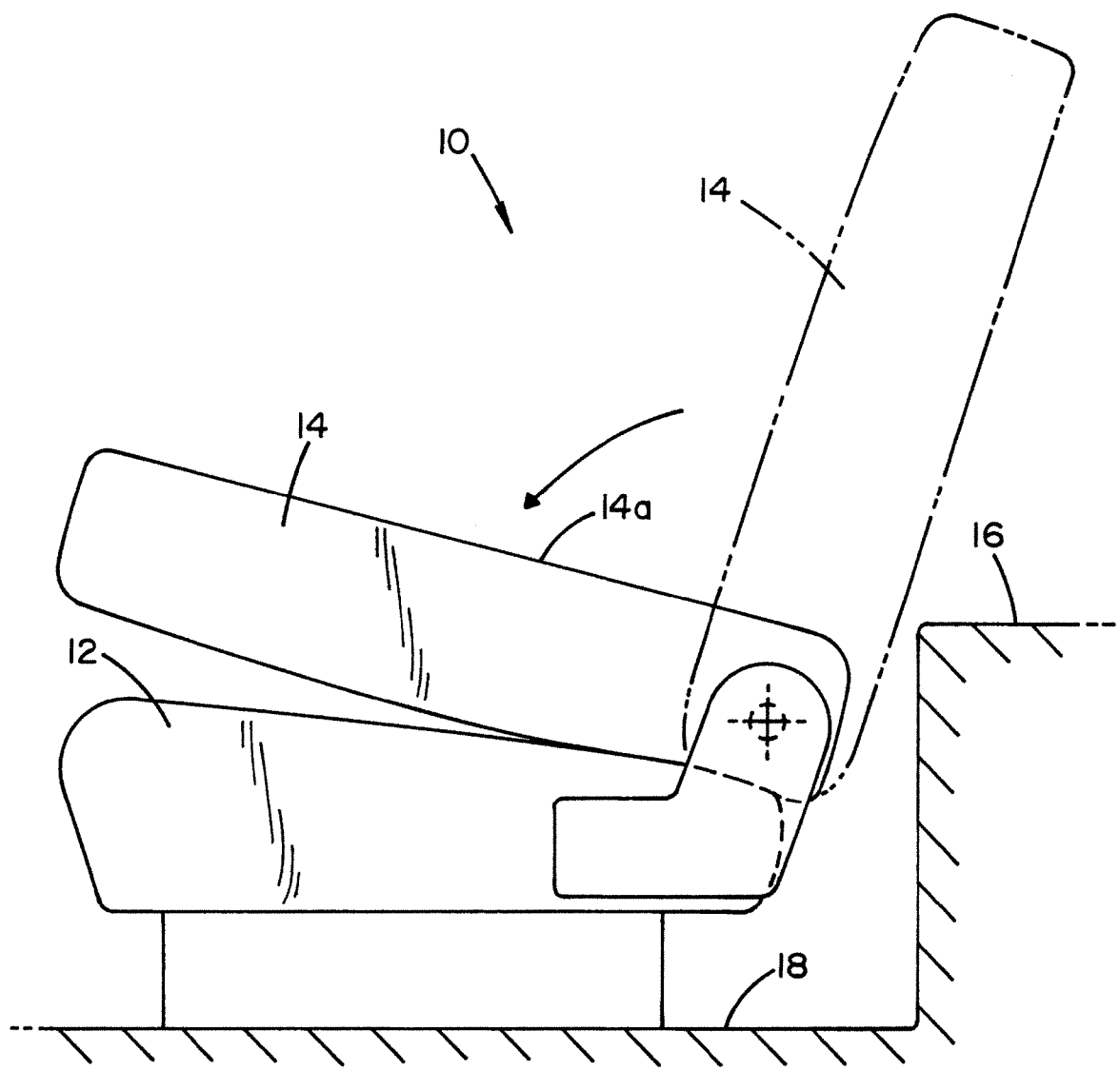
FIG. 1 is a schematic elevational view of a prior art vehicle seat assembly having a seat base and seat back pivotally mounted to the seat base.
Figure 2:
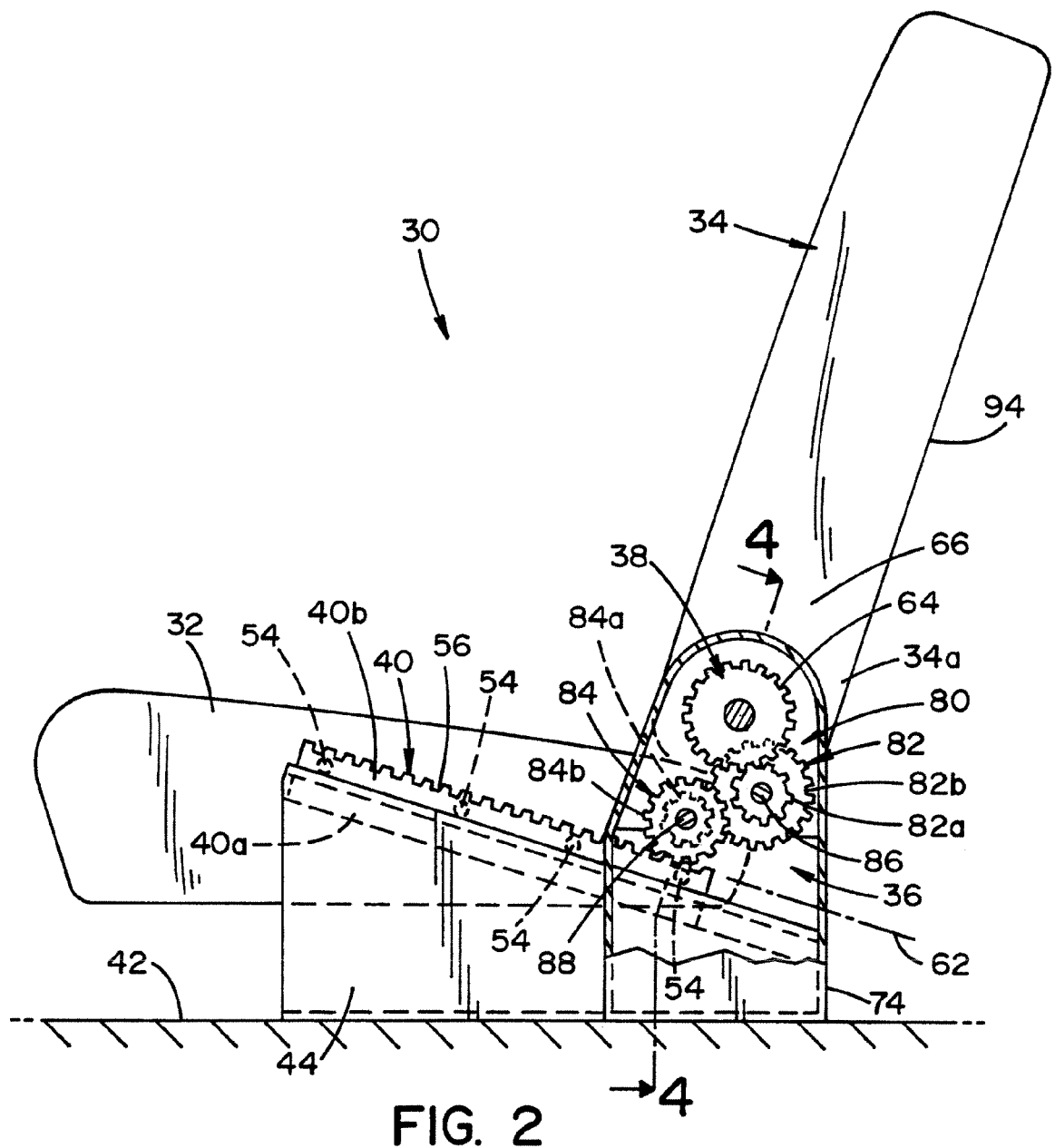
FIG. 2 is a schematic elevational view of a vehicle seat assembly having a seat base with a rack gear mounted thereto and a seat back pivotally mounted to the seat base with a pinion gear mounted at a lower end thereof, the seat back shown in an upright position.
Figure 3:
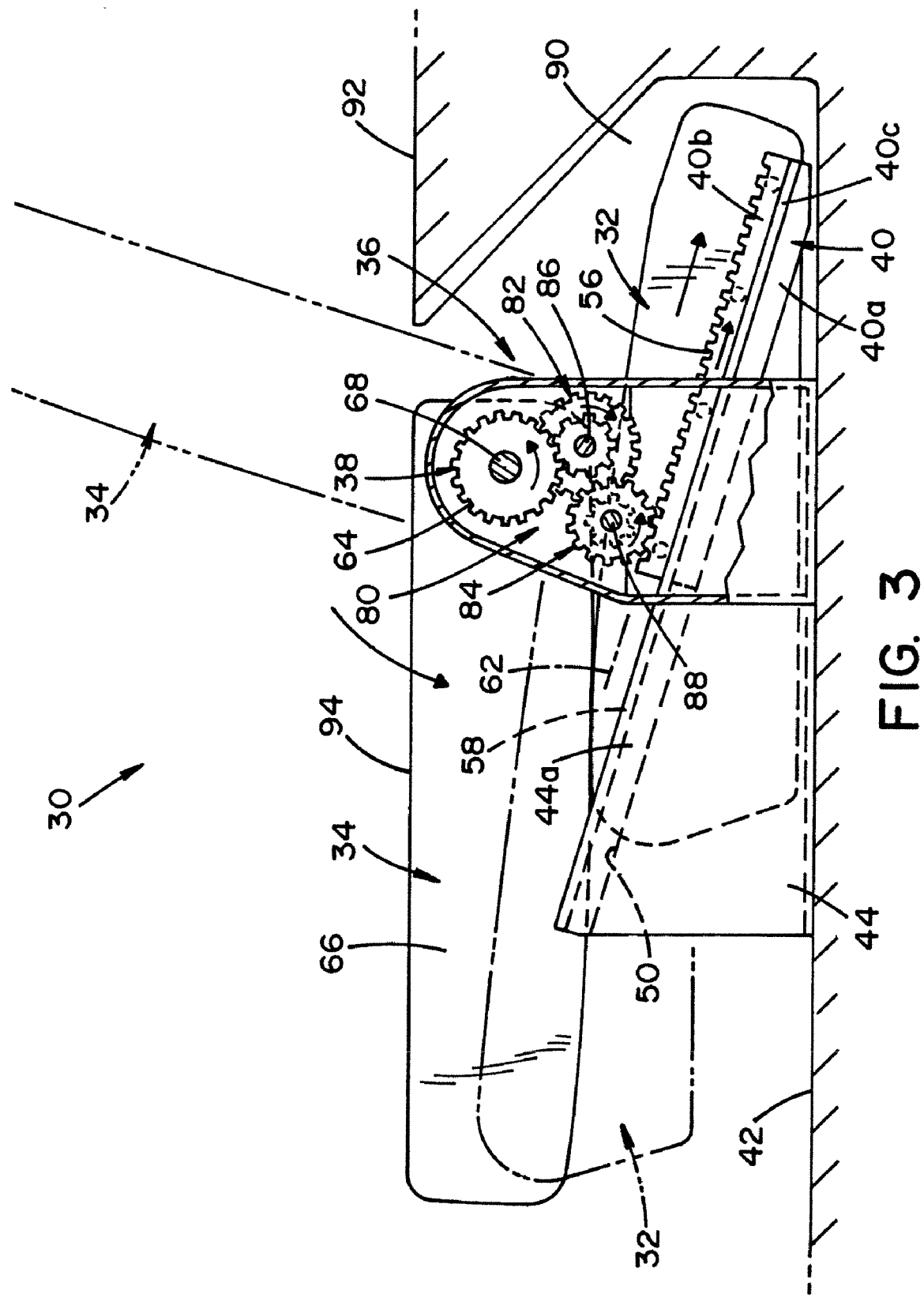
FIG. 3 is a partial schematic elevational view of the vehicle seat assembly of FIG. 2 showing the seat back in a stowed position.

Referring now to the drawings, wherein the showings are for purposes of illustrating one or more exemplary embodiments, FIGS. 2 and 3 show a vehicle seat assembly 30 including a seat base 32 and a seat back 34 pivotally mounted or rotatably coupled to the seat base 32. The vehicle seat assembly 30 includes a rack and pinion assembly 36, also referred to herein as a rack and pinion arrangement, for controlling relative movement between the seat back 34 and the seat base 32. The rack and pinion assembly 36 includes a pinion gear 38 mounted to the seat back 34 at a lower end 34a thereof and a rack gear 40 mounted to the seat base 32. As will be described in more detail below, the pinion gear 38 and the rack gear 40 are arranged such that pivotable movement of the seat back 34 effects longitudinal movement of the seat base 32, such as along a longitudinal length of the seat base 32. In addition, the pinion gear 38 and the rack gear 40 are further arranged in the illustrated embodiment such that pivotable movement of the seat back 34 also effects vertical movement of the seat base 32.

Figure 4:
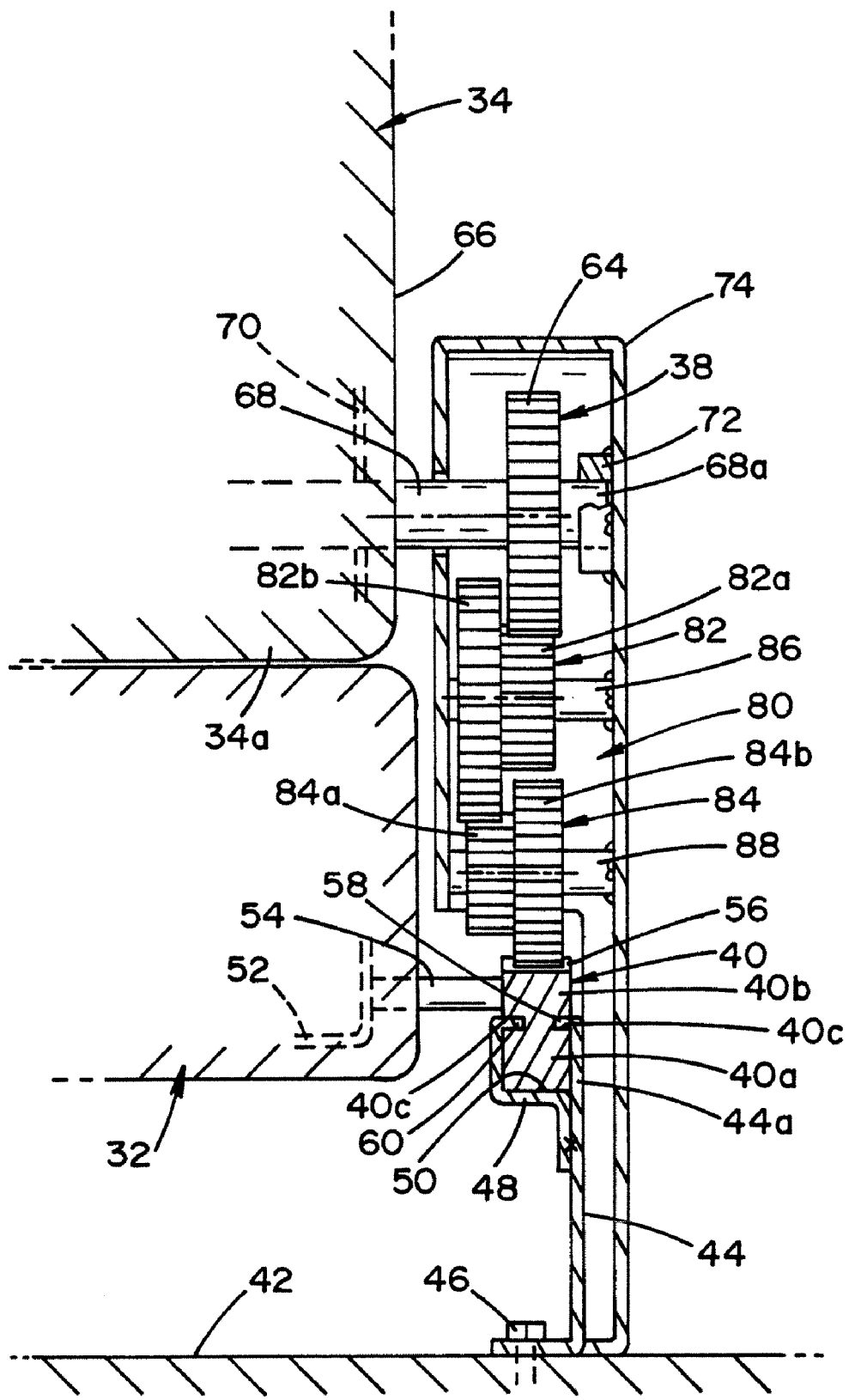
FIG. 4 is a partial cross-sectional view taken along the line 4-4 of FIG. 2 showing a drive train mechanically coupling the pinion gear of the seat back to the rack gear of the seat base.

With additional reference to FIG. 4, the seat base 34 is mounted in a vehicle, and particularly to a body floor 42 of the vehicle. To support the seat base 32 in an elevated or raised position relative to the floor 42, the seat base 32 can be supported by a pair of legs 44 (only one shown in FIG. 4), which can be fastened to the body floor 42, such as via bolts 46. As shown, a guide forming member 48 can be mounted to an upper end 44a of the leg 44 to define a guide or track 50 for the rack gear 40. The rack gear 40 can be slidably received in the track 50 and can be fixedly secured to a frame 52 of the seat base 34 by mounting bars 54. In the illustrated embodiment, the rack gear 40 includes a lower portion 40a slidably received within the track 50 formed by the guide forming member 48 and the upper portion 44a of leg 44. The rack gear 40 can also include an upper portion 40b having teeth 56 defined along an upper surface thereof. The mounting bars 54 secure the upper portion 40b of the rack gear 40 to the seat base 34. Between the lower portion 40a and the upper portion 40b of the rack gear 40, opposed recesses 40c are defined for receiving guide flanges 58, 60 of the leg 44 and guide forming member 48, respectively. As illustrated, the rack gear 40 can be angularly mounted relative to a horizontal plane (e.g., a plane defined by the body floor 42) for effecting the longitudinal and vertical movement of the seat base 32 when the seat back 34 is pivoted. For example, as shown in the illustrated embodiment, the rack gear 40 can be angularly oriented at an angle of approximately 17° relative to a horizontal plane.

In particular, and as will be described in more detail below, the pinion gear 38 is mechanically coupled to the rack gear 40 so that the seat base 32 moves along an axis 62 defined by the rack gear 40 as the seat back 34 is pivoted relative to the seat base 32. The rack gear 40 and its axis 62 can be oriented to move the seat base 32 at least one of longitudinally and vertically when the seat back 34 is pivoted. In the illustrated embodiment, the axis 62 of the rack gear 40 is oriented to move the seat base 32 both longitudinally and vertically when the seat back 34 is pivoted. In particular, the axis 62 is oriented angularly relative to a horizontal plane (e.g., a plane defined by the body floor 42) for moving the seat back 34 both longitudinally and vertically when the seat back 34 is pivoted relative to the seat base 32.

The pinion gear 38 is fixedly mounted to a lower end 34a of the seat back 34 adjacent the seat base 32. In particular, as shown in the illustrated embodiment, the pinion gear 38, which has teeth 64, can be fixedly mounted to a lateral side 66 of the seat back 34 by a mounting shaft 68. The mounting shaft 68 can be fixedly mounted to a frame 70 of the seat back 34 such that the pinion gear 38 rotates with the seat back 34 whenever the seat back 34 is pivoted. In the illustrated embodiment, distal end 68a of the mounting shaft 68 can be supported by a support collar 72, which itself can be supported by a support housing 74.

The rack and pinion assembly 36 can additionally include a drive train 80 that mechanically couples the teeth 64 of the pinion gear 38 with the teeth 56 of the rack gear 40 so as to move the rack gear 40 along the axis 62 defined by the rack gear 40 when the pinion gear 38 is rotated relative to the rack gear 40 by rotatable movement of the seat back 34. The drive train 80 of the illustrated embodiment includes a first compound gear 82 and a second compound gear 84. The first compound gear 82 is rotatably mounted on a shaft 86 fixedly secured to the housing 74. The second compound gear 84 is rotatably mounted on a shaft 88 that is also fixedly secured to the housing 74. The compound gear 82 includes a small gear 82a having teeth meshed with teeth 64 of the pinion gear 38 and a large gear 82b having teeth meshed with teeth of a small gear 84a of the compound gear 84. The compound gear 84 also includes a large gear 84b having teeth meshed with the teeth 56 of the rack gear 40. Of course, the drive train 80 is only one exemplary drive train that could be employed in the rack and pinion assembly 36. It is to be appreciated by those skilled in the art that other drive trains could be employed with equal effectiveness. For example, the compound gears 82, 84 could be eliminated in an alternate configuration.

In operation, the seat back 34 is movable between an upright use position (illustrated in FIG. 2 and in phantom in FIG. 3) to a folded-down stowage position (illustrated in FIG. 3). Simultaneous with the movement of the seat back 34 from the upright use position to the folded-down stowage position, the seat base 32 is movable between a forward use position (shown in FIG. 2 and in phantom in FIG. 3) that corresponds to the upright position of the seat back 34 and a rearward stowage position (shown in FIG. 3) that corresponds to the folded-down stowage position of the seat back 34. Thus, movement of the seat back 34 from the upright use position to the folded-down stowage position simultaneously moves the seat base 32 from the forward use position to the rearward stowage position via the pinion gear 38 and the rack gear 40 (through the drive train 80 in the illustrated embodiment). Such movement of the seat base 32 along the axis 62 when the seat back 34 is pivoted toward the seat base 32 removes the seat base 32 from inhibiting complete fold-down of the seat back 34. As best shown in FIG. 3, the seat base 32 in the rearward stowage position can be received in an alcove or recess 90 defined rearward of the pivot location (shaft 68 at which the seat back 34 pivots relative to the seat base 32). The alcove 90 can be defined below a cargo floor 92, which is also disposed behind the pivot location of the seat back 34 (i.e., shaft 68).

Movement of the seat back 34 from the upright position to the fold-down position also moves the seat base 32 from a forward raised position to a rearward lower position. Conversely, movement of the seat back 34 from the folded-down position to the upright position moves the seat base 32 from the rearward lowered position to the forward raised position. In the illustrated embodiment, the seat base 32 is in a first vertical position (i.e., a higher vertical position) when in the forward use position and in a second vertical position (i.e., a lower vertical position) when in the rearward stowage position. The second vertical position is oriented vertically lower (e.g., relative to body floor 42) than the first vertical position.

Advantageously, when the seat base 32 is in the folded-down rearward stowage position and thus in the second lower vertical position, interference between the seat base 32 and the seat back 34 is minimized enabling the seat back 34 to form a substantially flat load floor. In particular, a rear side 94 of the seat back 34 forms a load floor that is generally coplanar with the cargo floor 92 disposed rearwardly of the seat back 34.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:
1. A vehicle seat assembly, comprising:
   a seat base having a single rack gear mounted thereto; and
   a seat back pivotally mounted to said seat base with a pinion gear mounted at a lower end thereof, said pinion gear and said rack gear arranged such that pivotal movement of said seat back effects longitudinal movement of said seat base,
   wherein the rack gear is linearly disposed relative to the pinion gear so that rotational movement of the seat back is translated into linear movement of the seat base.
2. The vehicle seat assembly of claim 1 wherein said pinion gear and said rack gear are further arranged such that said pivotal movement of said seat back also effects vertical movement of said seat base.
3. The vehicle seat assembly of claim 2 wherein said rack gear is angularly mounted relative to a horizontal plane for effecting said vertical movement of said seat base when said seat back is pivoted.
4. The vehicle seat assembly of claim 1 wherein said seat back is movable between an upright use position to a folded-down stowage position, and said seat base is movable between a forward use position that corresponds to said upright use position of said seat back and a rearward stowage position that corresponds to said folded-down stowage position of said seat back.
5. The vehicle seat assembly of claim 4 wherein movement of said seat back from said upright use position to said folded-down stowage position simultaneously moves said seat base from said forward use position to said rearward stowage position via said pinion gear and said rack gear.

6. The vehicle seat assembly of claim 4 wherein said seat base is in a first vertical position when in said forward use position and in a second vertical position when in said rearward stowage position, said second vertical position oriented vertically lower than said first vertical position.

7. The vehicle seat assembly of claim 6 wherein said seat base in said rearward stowage position and said second vertical position minimizes interference between said seat base and said seat back enabling said seat back to form a substantially flat load floor when in said folded-down stowage position.

8. The vehicle seat assembly of claim 7 wherein a rear surface of said seat back forms said substantially flat load floor that is coplanar with a rearwardly disposed cargo floor.

9. The vehicle seat assembly of claim 1 wherein movement of the seat base is along a linear axis.

10. A rack and pinion seat assembly for a vehicle, comprising:
    a seat base mounted in a vehicle;
    a seat back pivotally mounted to said seat base;
    a pinion gear mounted to said seat back; and
    a linearly disposed rack gear mounted to said seat base, said pinion gear is mechanically coupled to said rack gear so that said seat base moves along a linear axis defined by said rack gear as said seat back is pivoted relative to said seat base,
    wherein said linear axis is oriented to move said seat base both longitudinally and vertically when said seat back is pivoted,
    wherein said seat back is pivotally movable between an upright position and a folded-down position, movement of said seat back from said upright position to said folded-down position moves said seat base from a forward raised position to a rearward lowered position, and movement of said seat back from said folded-down position to said upright position moves said seat base from said rearward lowered position to said forward raised position.

11. The seat assembly of claim 10 wherein the rack gear is a single rack gear linearly disposed relative to the pinion gear.

12. The seat assembly of claim 10 wherein said axis is oriented angularly relative to a horizontal plane for moving said seat base both longitudinally and vertically when said seat back is pivoted relative to said seat base.

13. The seat assembly of claim 10 wherein said pinion gear is mounted to a lower end of said seat back adjacent said seat base and said rack gear is mounted along a longitudinal length of said seat base.

14. The seat assembly of claim 10 wherein movement of said seat base along said axis when said seat back is pivoted toward said seat base removes said seat base from inhibiting complete fold-down of said seat back.

15. A rack and pinion arrangement, comprising:
    a vehicle seat assembly having a seat base and a seat back rotatably coupled to the seat base;
    a rack gear having teeth mounted to the seat base; and
    a pinion gear having teeth mounted to the seat back, said teeth of said pinion gear are mechanically coupled with the teeth of said rack gear to move said rack gear along an axis defined thereby when said pinion gear is rotated relative to said rack gear by rotatable fold-over movement of said seat back,
    wherein a drive train including at least one compound gear interconnects said pinion gear and said rack gear to simultaneously move said seat base along said axis as said seat back is pivoted.

16. The rack and pinion arrangement of claim 15 wherein said rack gear is fixedly secured to said seat base and angularly oriented relative to a horizontal plane.

17. The rack and pinion arrangement of claim 15 wherein said axis of said rack gear is oriented to move said rack gear longitudinally and vertically when said pinion gear is rotated.

* * * * *